United States Patent [19]

Kugler et al.

[11] Patent Number: 4,780,789
[45] Date of Patent: Oct. 25, 1988

[54] METHOD FOR GENERATING CIRCUIT-BREAKING SIGNALS

[75] Inventors: Robert Kugler, Wendelsteih; Hans-Eberhard Simmel, Karlsruhe, both of Fed. Rep. of Germany

[73] Assignee: Siemens Aktiengesellschaft, Munich, Fed. Rep. of Germany

[21] Appl. No.: 865,102

[22] Filed: May 20, 1986

[30] Foreign Application Priority Data

May 24, 1985 [DE] Fed. Rep. of Germany ....... 3519262

[51] Int. Cl.$^4$ .................... H02H 3/08; H02H 3/44
[52] U.S. Cl. ........................ 361/94; 361/98; 361/87
[58] Field of Search ............ 361/78, 87, 93, 94, 361/97, 98, 95, 96; 364/481, 483

[56] References Cited

U.S. PATENT DOCUMENTS

| 3,654,516 | 4/1972 | Traversi | 361/93 X |
|---|---|---|---|
| 3,978,374 | 8/1976 | Rohr | 361/95 X |
| 3,983,377 | 9/1976 | Vitins | 364/481 X |
| 4,208,692 | 6/1980 | Rohr | 361/87 |
| 4,219,858 | 8/1980 | De Puy et al. | 361/93 |
| 4,219,860 | 8/1980 | De Puy | 361/94 |
| 4,432,031 | 2/1984 | Premerlani | 361/97 |
| 4,589,073 | 5/1986 | Kidd | 364/483 |
| 4,605,982 | 8/1986 | Harner et al. | 361/94 |
| 4,642,724 | 2/1987 | Ruta | 361/96 |

Primary Examiner—M. H. Paschall
Attorney, Agent, or Firm—Kenyon & Kenyon

[57] ABSTRACT

A method for generating a circuit-breaking signal in dependence upon the magnitude and duration of an excess current, where a measured quantity, derived from the excess current, is sampled, is converted into digital values, and these values are weighted in accordance with a predetermined function and are added in order to obtain a circuit-breaking signal when the sum exceeds a predetermined comparison value. In order to improve upon a method of this kind in such a manner that, in the case of a diminishing excess current, a false interruption of the circuit is safely prevented, an auxiliary quantity ($\Delta i$) is formed which corresponds to the difference quotient or differential quotient of the measured quantity (M) and when the absolute amount of the auxiliary quantity ($\Delta i$) is already below a predetermined limit value and the sampled value of the excess current is below a predetermined threshold (S), the addition is interrupted.

7 Claims, 2 Drawing Sheets

INTRR. = INTERROGATION

METHOD FOR GENERATING CIRCUIT-BREAKING SIGNALS

BACKGROUND OF THE INVENTION

The present invention relates to methods for generating circuit-breaking signals, in dependence upon the magnitude and the duration of an excess current, where a rectified measured quantity is derived from the excess current and sampled, the samples measured values are converted into corresponding digital values which are then individually weighted in accordance with a predetermined function, and added, and if the sum total exceeds a predetermined comparison value, a circuit-breaking signal is formed, whereas addition is interrupted prior to the formation of the circuit-breaking signal if the excess current falls below a given threshold for a period of time.

A known monitoring device described in German Patent Specification No. 29 50 031 (See U.S. Pat. Nos. 4,219,860 and 4,219,858) operates in accordance with a method of this kind. In this known monitoring device, a measured quantity is obtained from the current which is to be monitored by rectification, sampled by a sampling circuit, and the sampled values obtained in this way are converted into corresponding digital values in an A/D-converter. The digital values are weighted in a function generator, and subsequent to weighting, are added in an adder circuit. When the count of the adder circuit reaches a given comparison value, a circuit-breaking signal is produced. In the known monitoring device, the A/D-converter is connected to a circuit assembly which continuously checks whether the current to be monitored comprises excess current values. When this occurs, a clock-controlled counter connected to the output of the circuit assembly is continuously reset. If the reset signal for the circuit assembly fails to appear, the clock-controlled counter counts up to a predetermined count and then resets the adder circuit. To prevent this from taking place when, on the basis of the curve of the rectified masured quantity, the instantaneous values thereof fall below a value which characterizes an excess current value, in the known monitoring device, the predetermined count must be set to be such that this count can be reached only following a length of time which exceeds the duration of a half-cycle of the current which is to be monitored. In certain situations, this can lead to the circuit being broken even when such is unnecessary. In any case, the known monitoring device which operates in accordance with the described method for currents of 50 Hz or 60 Hz, requires counters which are differently set in respect of the critical count.

SUMMARY OF THE INVENTION

One object of the present invention is to provide a method for generating a circuit-breaking signal in dependence upon the magnitude and duration of an excess current, where the time at which the addition is interrupted, in the event of a diminishing excess current, is dependent upon the curve of the measured quantity, and thus, independently of the frequency of the current which is to be monitored in respect of excess current values, occurs approximately after one half-cycle of the current which is to be monitored.

In accordance with the present invention, a method is provided for generating a circuit-breaking signal in dependence upon the magnitude and duration of an excess current, where the time at which the addition is interrupted, in the event of a diminishing excess current, is dependent upon the curve of the measured quantity, and thus, independently of the frequency of the current which is to be monitored in respect of excess current values, occurs approximately after one half-cycle of the current which is to be monitored.

In accordance with the present invention, a method of producing a circuit-breaking signal in dependence upon the magnitude and the duration of an excess current, includes the steps of:

(a) sampling a rectified measured quantity derived from the excess current, and converting the sampled measured values into corresponding digital values;

(b) weighting the digital values in accordance with a predetermined function and then adding them, and if the sum value exceeds a predetermined comparison value, generating the circuit-breaking signal;

(c) interrupting the addition prior to generation of the circuit-breaking signal if the excess current falls below a predetermined threshold for a period of time;

(d) the method further including the formation of an auxiliary quantity which corresponds to at least one of a difference quotient or differential quotient of the rectified measured quantity;

(e) determining the sign of the auxiliary quantity and in the event of a change in its sign from positive to negative, storing the sampled maximum value occurring at that time, and continuing the addition in clock-controlled fashion until the sign again changes from positive to negative;

(f) comparing the absolute amount of the auxiliary quantity with a predetermined limit value and each sampled value with the predetermined threshold of the excess current; and (g) interrupting the addition if the absolute amount of the auxiliary quantity is below the predetermined limit value and the sampled value of the excess current is below the predetermined threshold.

Thus, a device operating in accordance with this method can be designed independently of the frequency of a current which is to be monitored in respect of excess current values, since an interruption of the addition process in the case of a diminishing excess current is actuated not by a counter which counts to a given count, but on the basis of a comparison of the absolute amount of the auxiliary quantity with a predetermined limit value and a comparison of the sampled value of the excess current with a predetermined threshold. Interruption of the addition process always takes place in dependence upon the actual curve of the measured quantity.

The auxiliary quantity can be obtained in different ways in the method in accordance with the invention. For example, the auxiliary quantity can be obtained by differentiation of the rectified measured quantity. However, in order to execute the method in accordance with the invention in a simple fashion, it would appear more advantageous to compare consecutive sampled values with one another and to determine the sign and the absolute amount of the auxiliary quantity on the basis of the comparison. Thus the auxiliary quantity can be obtained by simple difference formation.

In order to execute the method in accordance with the invention in a manner which is both simple and reliable, it has proved advantageous to produce an energizing signal on the first occasion on which the predetermined threshold is exceeded by the current which is to be monitored, thus in the case of an excess current, the signal is produced, in response to which the sampled value is stored and addition is commenced, starting from zero. In this way, it is not only possible precisely to define the starting conditions for the addition process, but it is also ensured that from the first instant at which an excess current occurs, the values sampled at that time can be included in the addition. As a result, the accuracy of the method in accordance with the invention is extremely high.

In order to adapt the method in accordance with the invention to the fulfillment of a frequently imposed requirement, namely, that of not falling below a minimum circuit-breaking time, the energizing signal advantageously starts a fixed time counter, on the completion of the count of which, if the predetermined comparison value is reached during the addition process, a circuit-breaking signal is produced. It has also proved advantageous, if, in the method in accordance with the invention, in response to the energizing signal, a predetermined number of consecutive sampled values is stored and an investigation carried out, by forming the difference in pairs of the last three stored, sampled values, to establish when there is occurrence of a maximum value of the excess current, and when a maximum value is determined, this is stored. In the practical implementation of the method in accordance with the invention, the paired difference formation of the three last-stored, sampled values allows it to be established, without any noticeable outlay, as to whether one difference formation results in a positive sign and the other difference formation results in a negative sign; if this is so, an intermediate value can only represent a maximum value, which can then be stored and further processed in a simple manner.

In the method in accordance with the invention, it has also proved advantageous to withdraw the energizing signal when a maximum value occurs which is below the given threshold of the excess current and the absolute amount of the auxiliary quantity is below the given limit value. When the energizing signal is withdrawn, for example, the weighting and the addition can be interrupted. Thus, this also prevents the formation of a circuit-breaking signal.

In order also to interrupt the addition process in those relatively rare situations in which the excess current continuously converges towards zero, in accordance with a further development of the method of the invention, the predetermined number of stored, sampled values results in a value below a predetermined minimum value. As a result of the withdrawal of the energizing signal, the addition is interrupted and thus the formation of a circuit-breaking signal is prevented.

BRIEF DESCRIPTION OF THE DRAWINGS

The invention will be explained in greater detail in the following detailed description with reference to the drawings, in which.

DETAILED DESCRIPTION

Figure 1:
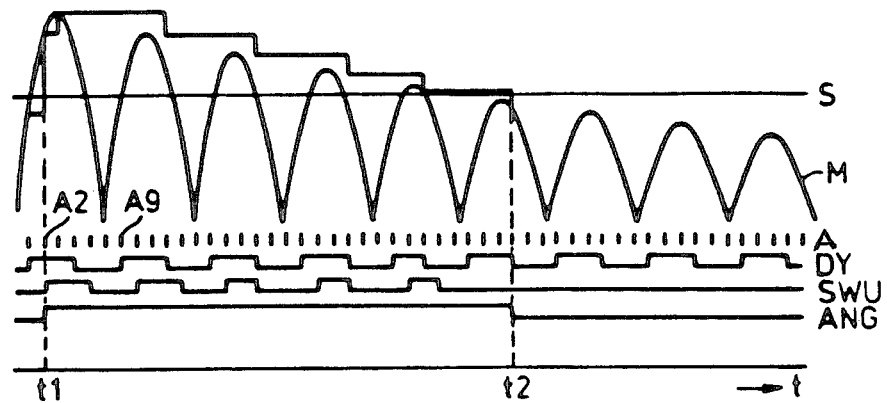
FIG. 1 is a graph showing a waveform diagram of a rectified measured quantity obtained from the current which is to be monitored.

With reference now to the drawings, FIG. 1 represents, by way of example, a measured quantity M plotted against time t, where the measured value M is formed by rectification from a single-phase alternating current which is to be monitored, together with a train of sampling pulses A, and waveforms DY, SWU and ANG, to be described with reference to FIG. 3.

Figure 2:
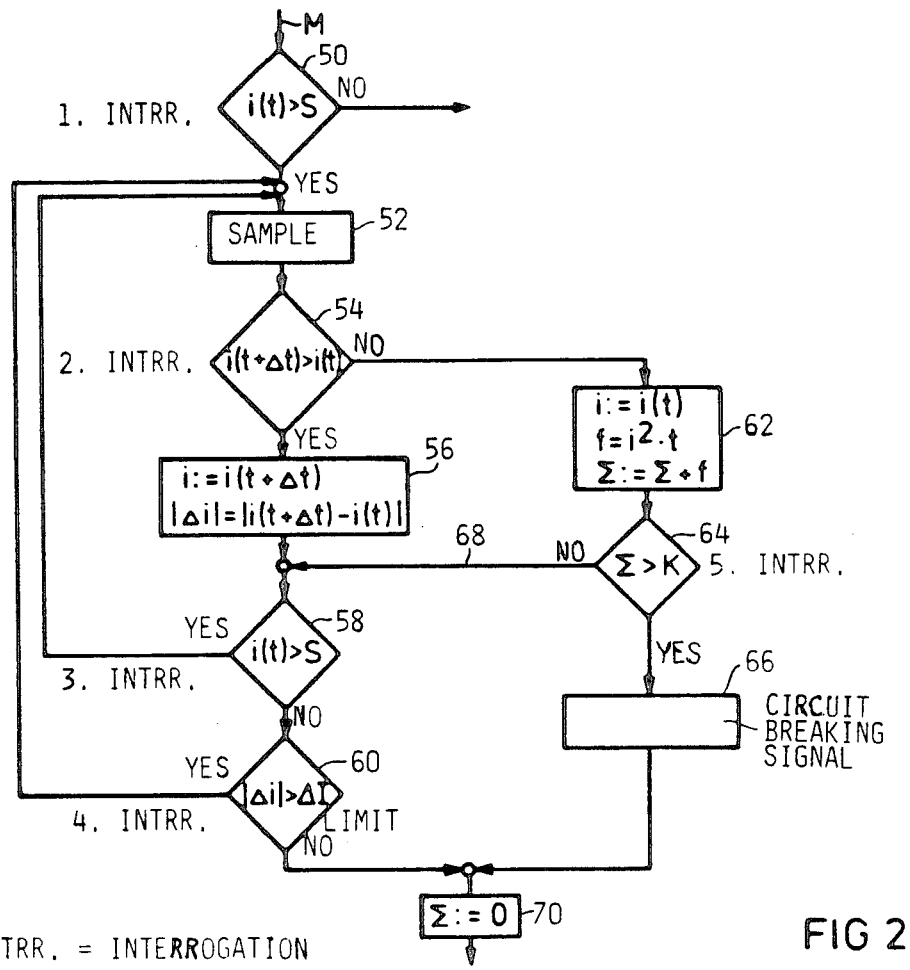
FIG. 2 is an explanatory flow diagram of the method proposed in accordance with the invention.

As shown in FIG. 2, the measured value M obtained in this way is investigated in a first interrogation 50 to establish whether it comprises instantaneous values above a predetermined threshold S. In respect of the curve, represented in FIG. 1, the measured quantity M, this is so in the case of the second sampling signal A2. Therefore, the first interrogation of the flow diagram shown in FIG. 2 is responded to at this instant in time by "yes", and the sampling of further values of the measured quantity M, as shown at 52, commences, as can be seen from FIG. 1. The sampled values are then checked in a second interrogation 54 to establish whether the sampled value $i(t+\Delta t) > i(t)$, and thus whether the later-sampled value is greater than the previous. If this is so, then the last-sampled instantaneous value $i(t+\Delta t)$ of the measured quantity M is stored and the absolute amount of the difference between the last-sampled instantaneous value and the previous instantaneous value—i.e., the absolute amount of the auxiliary quantity $\Delta i$—is formed, as shown at 56.

In a third interrogation 58, the sampled instantaneous value of the measured quantity M is checked to determine whether it is greater than the predetermined threshold S. If so, the sampling is continued. If the sampled instantaneous value is below the predetermined threshold S, then a further (fourth) interrogation 60 is carried out in which the absolute amount of the auxiliary quantity $\Delta i$ obtained by difference formation is checked to determine if it is greater than a predetermined limit value $\Delta I$. If this is so, the sampling is continued. If this is not so, the sampling is interrupted.

If the result of the second interrogation 54 is that a last-sampled instantaneous value of the measured quantity M is smaller than the previously-sampled instantaneous value, then the preceding instantaneous value $i(t)$ is stored, is weighted in accordance with a function $f = i^2 t$ and the weighted digital values are added. See 62. In a further (fifth) interrogation 64, the addition is checked to determine if it has reached a predetermined comparison value K. If this is so, a circuit-breaking signal is produced as shown at 66. Othrwise, the addition is continued or is interrupted at 70 without the formation of a circuit-breaking signal via flow line 68.

When the circuit has been broken, the addition is returned to zero as shown at 70, which generally takes place at the start of a new incidence of excess current.

Figure 3:
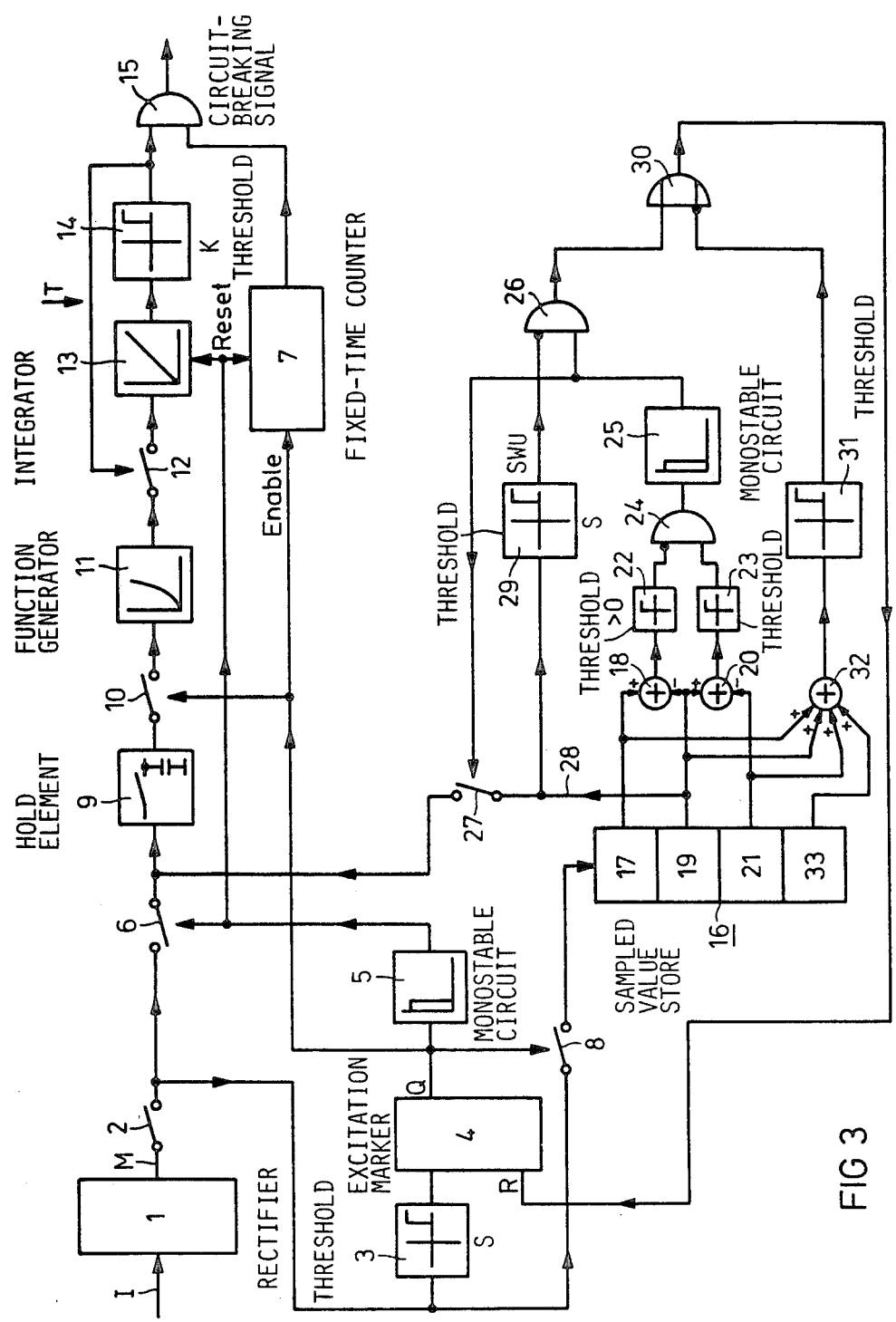
FIG. 3 is a simplified block schematic circuit diagram of one exemplary means for performing the method in accordance with the invention.

The method in accordance with the invention can advantageously be carried out using a micro-computer; therefore the block circuit diagram shown in FIG. 3 is merely a simplified representation by way of explanation of the sequence of the method proposed in accordance with the invention.

The alternating current I which is to be monitored is rectified in a rectifier circuit 1 and sampled by a sampling device represented schematically by a contact 2. If currents are to be monitored in a multi-phase system, then, in a manner known per se, in place of the rectifier 1, an envelope curve former is used which is acted upon at its input by quantities obtained from the currents in all phases. The sampled values of the measured quantity M, occurring at the output of the rectifier 1, are then fed to means for A/D-conversion, not shown for the sake of simplicity in the drawing, and then to a module 3 which sets a circuit-breaking threshold which corresponds to the predetermined threshold S in FIG. 1. The output of the module 3 is connected to an excitation marker 4 which, in response to an output signal from the module 3, undergoes a change in potential at its output Q. This change in potential at the output Q of the excitation marker 4 also causes an enable signal to be fed to a fixed-time counter 7. Previously, the fixed-time counter 7 has been reset by the output signal of the monostable circuit 5. An additional contact 8 is also closed as a result of the change in potential at the output Q of the excitation marker 4.

As a result of the closure of the contact 6, the first sampled value (in the case of the sampling signal A2 in FIG. 1), which occurs following the occurrence of an excess current value, can be switched to a hold element 9 and therefore is stored in this hold element 9. Via a contact 10, which is also closed as a result of the change in potential at the output Q of the excitation marker 4, the stored value is weighted in a function generator 11 in accordance with a predetermined function, in particular, an $i^2t$-function, and the weighted value is fed into an integrator 13 via a contact 12 controlled by a clock signal T. This integrator 13 is followed by a threshold value module 14 in which a predetermined comparison value is stored. The output of the threshold value module 14 is connected to one input of an AND gate 15, whose other input is connected to the output of the fixed time counter 7.

Via the contact 8, the sampled instantaneous values of the measured quantity M act upon a sampled value store 16 in which a predetermined number of consecutive, sampled values can be stored. In the exemplary embodiment, four consecutive, sampled values can be stored in the sampled value store 16. The output of the first storage position 17 is connected to a plus-input or an adder 18 whose minus-input is connected to the output of a further storage position 19. The output of this storage position 19 is connected to a plus-input of a further adder 20 whose minus-input is connected to an output of a further storage position 21. By means of the adders 18 and 20, the consecutive, sampled values are compared in pairs by subtraction and when a predetermined difference exists, signals are fed via threshold value modules 22 and 23 to a further AND-gate 24 whose upper input is an inverting input. This AND-gate 24 is followed by a monostable circuit 25 whose output is connected both to an input of an additional AND-gate 26 and to a control input of a contact 27.

The storage position 19 of the sampled value store 16 is connected via a connection line 28 to the contact 27 via which a further connection can be established to the hold element 9 when the contact 27 is actuated by an appropriate output quantity of the monostable circuit 25. The connection line 28 also leads to the input of a threshold value module 29 which is set at the predetermined threshold S for the circuit-breaking current. If this threshold S is exceeded, then a signal occurs at the output of the module 29 and is inverted at the input of the additional AND-gate 26.

The additional AND-gate 26 is connected at its output to an OR-gate 30 whose other input is an inverting input connected to the output of an additional threshold value module 31. This additional threshold value module 31 is connected to the output of an adder 32 which has respective inputs connected to the storage positions 17, 19 and 21, and to a fourth storage position 33 of the sampled value store 16. The output of the OR-gate 30 is connected to a reset-input R of the excitation marker 4.

The sequence of the method in accordance with the invention will now be explained, making reference to the circuit arrangement illustrated in FIG. 3.

An alternating current I, which is to be monitored, is rectified in the rectifier 1 and produces a measured quantity M as plotted in FIG. 1 in dependence upon the time. The rectified measured quantity M, obtained in this way, is sampled pulse-wise in a form represented in FIG. 1 by the sampling signals A. If the sampling results in a sampled value which is above the predetermined threshold value S in FIG. 1, then the threshold value module 3 is FIG. 3 responds at the time t1 and a change in potential occurs at the output of the excitation marker 4, which, in certain circumstances, leads to the activation of the fixed-time counter 7 and to the closure of the contact 8. For a predetermined length of time, the contact 6 is closed by the output signal of the monostable circuit 5 and a reset signal is fed to the fixed-time counter 7 and to the integrator 13. As a result, via contact 6, the first value which is sampled by the sampling signal A2 and which is above the predetermined threshold S can be stored in the hold element 9. Since the contact 10 is also closed in the event of a change in potential at the output Q of the excitation marker 4, this value is weighted and is added in a predetermined clock signal in the integrator.

With the following sampling signal, the instantaneous value of the measured quantity M virtually reaches the peak value; this sampled value is stored via the contact 8 in the storage position 17 of the sampled value store 16. It is not passed immediately to the hold element 9 because the contact 6 has since been reopened. Additional sample values are input consecutively into the sampled value store 16. The difference formation of consecutively-sampled sample values by the adders serve to produce the auxiliary quantity $\Delta i$, and in particular the sign thereof is determined, as shown by the curve DY in FIG. 1. A signal SWU is also produced by means of the threshold value module 29, as also shown in FIG. 1. This signal SWU characterizes the occasions when the predetermined threshold S is undershot. If the first three storage positions 17, 19 and 21 are filled, the adders 18 and 20 establish whether a maximum value is stored. If such a maximum value is contained in the storage position 19 (this is so when the adder 18 produces a quantity having a positive value and the adder 20 produces a quantity having a negative sign), it is fed via the contact 27, which is then closed, to hold element 9, where it is stored. This stored value is now weighted and the weighted values are added in the predetermined clock signal T in the integrator 13. The addition on the base of the determined maximum value continues until the adders 18 and 20 again produce output quantities with the above-described sign ratio. This is so in the case of the sampling signal A9. In this case, the contact 27 is then temporarily closed again via the monostable circuit 25 and the maximum value which is then contained in the storage position 19 is fed to the hold element 9 where it is stored. This (lower) maximum value is then weighted again and a clock-controlled addition in the integrator 13 takes place. This is carried out with further maximum values until the time t2 (see FIG. 1), because at this time a sampled value is established which is smaller than the predetermined threshold S and furthermore the adders 18 and 20 indicate that the difference between adjacent sampled values is relatively small, and thus the differential quotient is relatively small. In this case, the contact 27 is in fact no longer actuated so that a maximum value below the predetermined threshold S is no longer input into the hold element 9.

The additional AND-gate 26 is now acted upon by the outputs of the threshold value module 29 and the additional monostable circuit 25 in such manner that an output signal is emitted from the AND-gate 26, as a result of which the excitation marker 4 is acted upon at its reset input 4 by the OR-gate 30. Then, as a result of a signal change at the output Q of the excitation marker 4, the contact 8 is reopened so that no further sampled values can be stored. Furthermore, the contact 10 is opened and thus the integrator 13 is cut off from the hold element 9 so that the addition is interrupted. Consequently, the integrator 13 does not reach the predetermined comparison value which is given by the threshold value module 14 and no circuit-breaking signal is produced at the output of the AND-gate 15.

Different conditions prevail, on the other hand, if, although this is not represented in FIG. 1, the measured quantity M comprises values above the predetermined threshold S for a long period of time. In this case, the excitation is not canceled via the output signal OR-gate 30 before the integrator 13 has reached the predetermined comparison value, but the integrator 13 can in fact add up to this predetermined comparison value whereupon the threshold value module 14 then responds and from its output emits a signal to the following AND-gate 15. If the fixed-time counter 7 has then already completed its count, which is generally the case after 300 ms, a circuit-breaking signal occurs at the output of the AND-gate 15.

It should also be noted that under certain circumstances, the curve of the measured quantity M can be such that it continuously converges towards zero, and thus does not exhibit marked maximum values. In order to be able to prevent a circuit-breaking signal in this case, in accordance with the block-circuit diagram in FIG. 3, the stored values of all the storage positions 17, 19, 21 and 33 are added in the adder 32 and when a predetermined value is exceeded, the threshold value module 31 emits a signal which, having been inverted, produces an output signal from the OR-gate 30, whereupon the excitation marker 4 is reset. Thus, in this case also, a false interruption of the circuit is prevented.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for generating a circuit-breaking signal in dependence upon the magnitude and the duration of an excess current, comprising the steps of:
   (a) sampling a rectified measured quantity derived from the excess current, and converting the sampled measured values into corresponding digital values;
   (b) forming an auxiliary quantity which corresponds to at least one of a difference or differential of the rectified measured quantity;
   (c) weighting the digital values in accordance with a predetermined function and then adding them, and if the sum value exceeds a predetermined comparison value, generating the circuit-breaking signal;
   (d) determining the sign of the auxiliary quantity and in the event of a change of the sign from positive to negative, storing the sampled maximum value occurring at that time, and continuing the addition in clock-controlled fashion until the sign again changes from positive to negative;
   (e) comparing the absolute amount of the auxiliary quantity with a predetermined limit value and each sampled value with the predetermined threshold of the excess current; and
   (f) interrupting the addition if the absolute amount of the auxiliary quantity is below the predetermined limit value and the sampled value of the excess current is below the predtermined threshold.

2. A method as claimed in claim 1, further including the steps of:
   (a) comparing consecutive sampled values with one another; and
   (b) determining the sign and the absolute amount of the auxiliary quantity on the basis of the comparison.

3. A method as claimed in claim 1, further including the steps of:
   (a) producing an energizing signal on the first occasion when the predetermined threshold is exceeded by the excess current;
   (b) which signal causes the value sampled at that time to be stored; and
   (c) recommences the addition from zero.

4. A method as claimed in claim 3, further including the steps of:
   (a) using the energization signal to start a fixed-time counter, on the completion of the count of which the circuit-breaking signal is produced when the predetermined comparison value is reached during the addition process.

5. A method as claimed in claim 4, further including the steps of:
   (a) storing sample values in response to the energizing signal, a predetermined number of consecutively-occurring, sample values being stored; and
   (b) forming the difference in pairs of the three last-stored, sampled values in order to determine the occurrence of a maximum value of the excess current and storing any maximum value so determined.

6. A method as claimed in claim 3, further including the step of withdrawing the energization signal when a maximum value occurs which is below the predetermined threshold of the excess current and the absolute amount of the auxiliary quantity is below the predetermined limit value.

7. A method as claimed in claim 1, further including the steps of:
   (a) withdrawing the energization signal when the addition of the predetermined number of stored, sampled values results in a value below a predetermined minimum value.

* * * * *